United States Patent Office 2,912,893
Patented Nov. 17, 1959

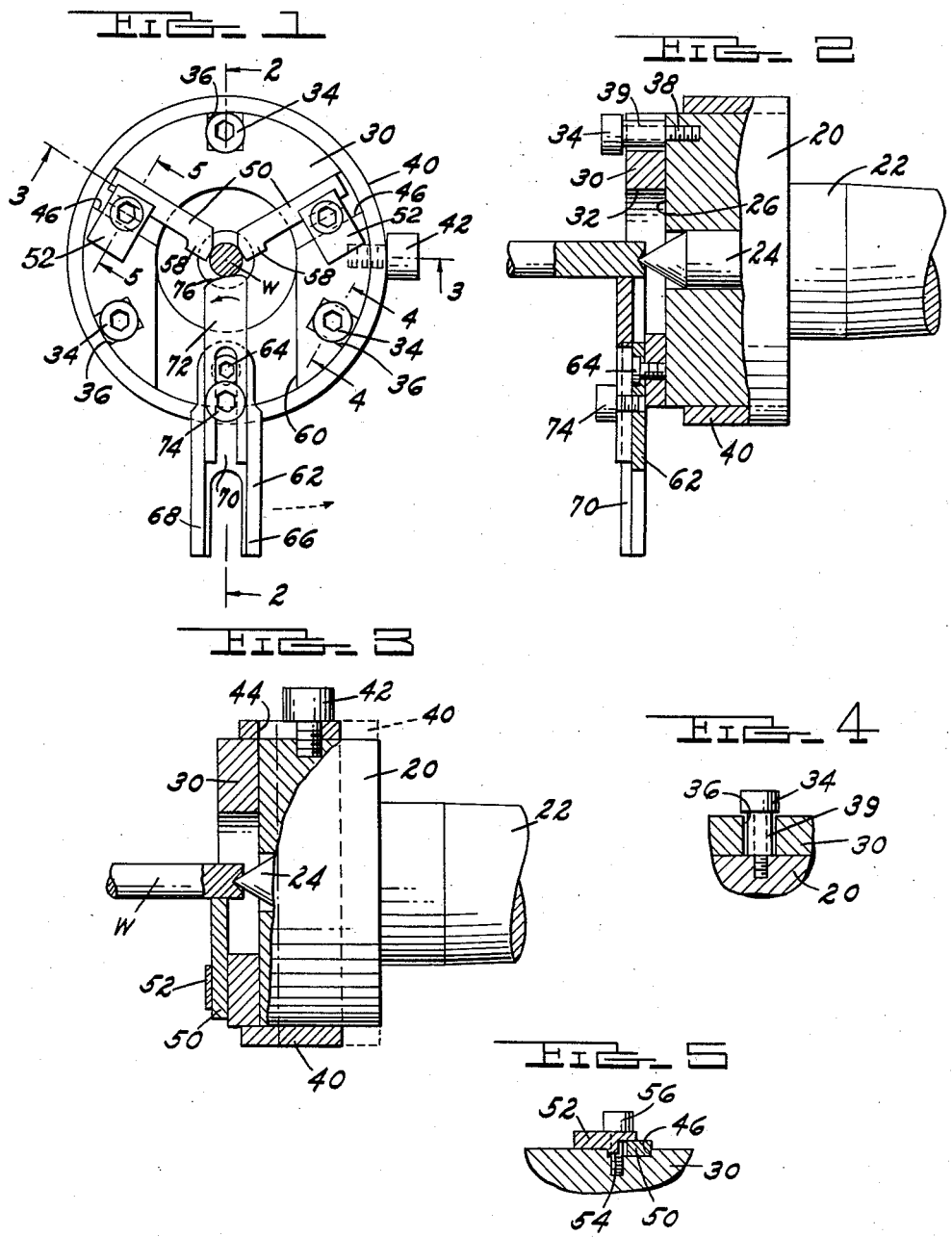

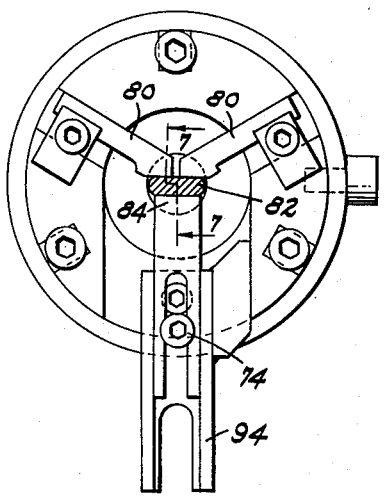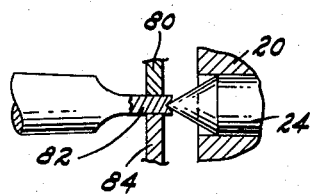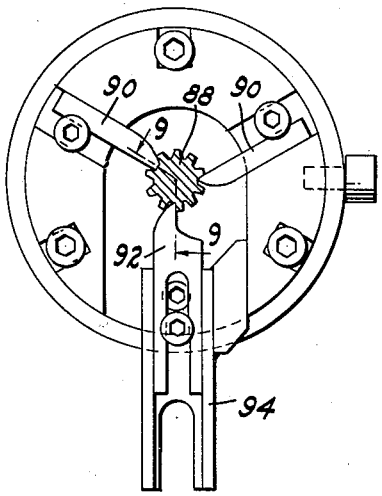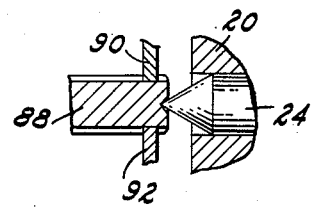

2,912,893

WORK DRIVER FOR MACHINE TOOLS

Rudolf W. Andreasson, Birmingham, Mich.

Application August 27, 1956, Serial No. 606,404

3 Claims. (Cl. 82—40)

This invention relates to a work driver for machine tools and contemplates an improvement on the ordinary type of work driver which is commonly in use today.

In the driving of slender fluted tools for purposes of grinding and so forth, it has been common in the past to use a so-called dog with a circular opening and set screw having two fingers which engage a projection on the chuck to turn the dog. Objections to this type of device arise on a number of grounds. For example, if the set screw on the dog is tightened up onto the part to hold it in place, it may mechanically damage the part and it sometimes will put a bend into the part, that is, spring it so that after it is ground it is out of round and not straight. Also, if the part is not exactly positioned properly in the dog, a cranking action develops. On the other hand, if the holding screw is left loose, the part may fall out and cause breakage or damage.

It is an object to provide an improved work driver which is especially adapted to be used for parts with odd shapes and which is so designed that during its operation it will not distort the shape of the piece which is being treated.

It is a further object of the invention to utilize the driving force on the work driver to function as a tightening force for the part; and thus when the driving force is released, the part is also released in effect automatically so that a quick change of parts to be ground or otherwise treated may be effected.

Other objects and features of the invention will be apparent in the following description and claims.

Drawings accompany the disclosure, and the various views thereof may be briefly described as:

Figure 1, an end elevation of the work driver.

Figure 2, a sectional view on line 2—2 of Figure 1.

Figure 3, a sectional view on line 3—3 of Figure 1.

Figure 4, a fragmentary section on line 4—4 of Figure 1.

Figure 5, a fragmentary section on line 5—5 of Figure 1.

Figure 6, an end elevation of the unit shown adapted for holding a flat part.

Figure 7, a fragmentary section on line 7—7 of Figure 6.

Figure 8, an end elevation of the unit showing the holding of a fluted part.

Figure 9, a fragmentary section on line 9—9 of Figure 8.

Referring to the drawings, in Figures 1 to 5 a mounting center unit having a head 20 has a mounting spindle shank 22 and an adjustable center piece 24 which may be made of materials such as carbide. An integral center may also be formed on the member 20 if desired. On the front face 26 of the enlarged head 20 on the center unit is a circular plate 30 having the same diameter as the head 20 and having a central opening 32. This plate 30 is held in place on the head 20 by headed bolts 34 passing through peripheral notches 36, the notches being wider circumferentially and radially than the shank 38 of the bolts, and a small roller 39 being interposed around the shouldered bolt shank. Therefore, the ring 30 will have considerable play on the head 20.

On the outer periphery of the head 20 is a slide sleeve 40, the position of which can be controlled by a headed bolt 42 acting in a slot 44. When the bolt 42 is loosened, the sleeve 40 may be moved forward, as shown in Figure 3, to center the ring 30. The purpose of this centering will be later described.

The ring 30 is provided with radial surfaces slots 46 on its outer surface between the notches 36. These surface slots serve as a mounting area for finger units 50 which are clamped against one edge of the slots by a clamp plate 52 having a locating rib 54 (Figure 5) which bears against the other side of the slot, the assembly being held in place by a bolt 56. The inner ends of the fingers 50 are shaped in a short L portion 58 so that one end bears tangentially against a round work piece W.

At one side of the ring 30 the outer surface is milled away to form a wide slot 60, and mounted on the floor of this milled portion is a bifurcate plate 62 pivoted on the head 20 by a flat headed bolt 64. The plate has two arms 66 and 68 at one end and is mounted at the other by the bolt 64. The outer surface of the plate 62 is grooved at 70 to receive a special finger element 72 clamped onto the plate by a bolt 74. The inner end of the special finger 72 is angled at 76 so that it will rotate into position in the direction of the arrow (Figure 1) to cam the work piece against the ends of fingers 58. The driving force for the unit is in the direction of the dotted arrow at the bottom of Figure 1, and this is accomplished in the usual manner by having a finger from a spindle head insert between the ends 66 and 68.

In preparing for a particular series of work pieces, the collar 40 is first moved forward, as shown in Figure 3, by the loosening of bolt 42. A sample work piece is then mounted properly, and the fingers are positioned to center it accurately in relation to the center member 24 and tightened in place. After the parts are adjusted to proper center, the sleeve 40 is moved back and the bolt 42 tightened to hold it in position, as shown in Figure 2. Thereafter each similar work piece can be quickly inserted and the plate will compensate for any slight variations in diameter or out-of-round. It is not necessary to use collar 40 except at the beginning of a run of a series of substantially identical pieces.

It will be understood that the usual tail stock assembly and center are used to support the part in conjunction with center 24 of the head 20. The parts are supported on the centers and driven by the contact fingers 58 which, by reason of the floating mount, can adjust to any initial out of round condition without placing a strain on the part which might cause inaccurate results in the finished part.

It will be seen that the driving force on the unit will tend to lock the work in place; and when the machine is turned off, the backlash on the plate 62 will cock the finger 72 in a clockwise direction (Figure 1) to release the work.

In Figures 6 and 7, the device has been shown with differently shaped fingers 80 adapted to hold a tang end 82 of a drill or reamer or other part. With this unit, a special finger member 84 butts up against the tang from one side, and the bolt 74 would hold it in place.

In Figures 8 and 9, the device is shown adapted to a fluted part 88 having fingers 90 clamped to position in two of the flutes about 120° apart, and a special finger 92 is clamped on the plate member 94.

I have thus disclosed a device which can be readily adapted to different shaped work parts by a ready change of the holding fingers. In addition, as shown in Figure 1, the device can utilize the driving force as a clamping force and will also automatically release when the machine is turned off. In addition, the centering sleeve permits accurate initial placement of the fingers; and during the operation the floating plate 30 permits the necessary movement of the part without creating a binding action and thus results in an accurately machined or ground part at the end of the operation.

I claim:

1. A work driver assembly for holding and driving one end of a slender work piece regardless of shape which comprises a head for mounting at the spindle end of a machine tool, said head having a cylindrical surface co-axial with the spindle, and a face surface transverse to the axis of the spindle, a work-center on said head, a ring plate on said face surface, means to mount said ring plate to have a limited movement in each direction on said head, a plurality of contact fingers releasably shiftable radially on said ring plate to contact a surface of a particular work piece at circumferentially spaced stationary adjustment points relative to said ring plate, and a contact finger on said ring plate positioned radially in opposition to said first-named fingers movable to hold a work piece in contact with said first fingers, said contact finger being pivotally mounted on said ring plate having a work-contact portion extending to the center of said assembly, and a driver portion on said pivotally mounted contact finger extending outwardly from said assembly, whereby circumferential force on said driver portion in one direction will shift said last named finger to exert a locking force on a work-piece between all of said fingers and cause rotation of said work and said assembly.

2. A work driver assembly for holding and driving one end of a slender work piece regardless of shape which comprises a head for mounting at the spindle end of a machine tool, said head having a cylindrical surface co-axial with the spindle, and a face surface transverse to the axis of the spindle, a work-center on said head, a ring plate on said face surface, means to mount said ring plate to have a limited movement in each direction on said head, a plurality of contact fingers releasably shiftable radially on said ring plate to contact a surface of a particular work piece at circumferentially spaced points, and a contact finger on said ring plate positioned radially in opposition to said first-named fingers movable to hold a work piece in contact with said first fingers, said contact finger being pivotally mounted on said ring plate having a work-contact portion extending to the center of said assembly, and a driver portion extending outwardly from said assembly, whereby circumferential force on said driver portion in one direction will exert a locking force on a work piece between all of said fingers and cause rotation of said work and said assembly, the head and the ring plate have substantially identical outer diameter, and a slide ring on said head shiftable axially to overlie at least a portion of said ring plate to center said plate relative to said head to permit accurate adjustment of said fingers on a work piece prior to a work-processing operation.

3. A device as defined in claim 1 in which said movable contact finger is composed of a portion pivoted on said ring wherein one end can move arcuately relative to the center of said ring, and the driver portion comprises a bifurcate arm mounted on said movable finger and radially adjustable relative to said movable finger.

References Cited in the file of this patent

UNITED STATES PATENTS

| | | |
|---|---|---|
| 189,953 | Niebell | Apr. 24, 1877 |
| 2,469,630 | Braun | May 10, 1949 |
| 2,543,117 | Mackmann | Feb. 27, 1951 |
| 2,558,252 | Ifanger | June 26, 1951 |
| 2,578,245 | Heaton | Dec. 11, 1951 |
| 2,586,067 | Le Pree | Feb. 19, 1952 |
| 2,657,065 | Wilhelm | Oct. 27, 1953 |
| 2,693,365 | Von Zelewsky | Nov. 2, 1954 |
| 2,733,072 | Hohwart | Jan. 31, 1956 |
| 2,757,008 | Lane | July 31, 1956 |

FOREIGN PATENTS

| | | |
|---|---|---|
| 266,945 | Switzerland | May 16, 1950 |